United States Patent [19]

Prueitt et al.

[11] Patent Number: 5,006,672
[45] Date of Patent: Apr. 9, 1991

[54] APPARATUS FOR STORING HIGH MAGNETIC FIELDS HAVING REDUCED MECHANICAL FORCES AND REDUCED MAGNETIC POLLUTION

[75] Inventors: Melvin L. Prueitt; Fred M. Mueller; James L. Smith, all of Los Alamos, N. Mex.

[73] Assignee: University of California Patent, Trademark & Copyright Office, Alameda, Calif.

[21] Appl. No.: 330,329

[22] Filed: Mar. 29, 1989

[51] Int. Cl.$^5$ .................................... H01B 12/00
[52] U.S. Cl. ........................ 174/125.1; 174/32; 323/360; 335/299; 505/887
[58] Field of Search ........... 174/125.1, 32; 323/360; 363/14; 335/299; 505/887

[56] References Cited

U.S. PATENT DOCUMENTS 4,622,531 11/1986 Eyssa et al. ................ 335/299 X
4,833,410 5/1989 Briquet et al. .............. 335/299 X

FOREIGN PATENT DOCUMENTS 51399 4/1979 Japan .................... 363/14
311713 12/1988 Japan .................... 323/360
412034 11/1966 Switzerland ............. 174/32

OTHER PUBLICATIONS

Campbell, L. J. et al., Stationary Configurations of Point Vortices and Other Logarithmic Objects in Two Dimensions; Phys. Rev. Lett. 58(7); 670–673; 1987.
Kadtke, James B. et al.; Method for Finding Stationary States of Point Vortices; Phys. Rev. A 36 (9); 4360–4370; 1987.
Peterson, H. A. et al.; Superconductive Energy Storage Inductor-Converter Units for Power Systems; IEEE Transactions on Power Apparatus and Systems; vol. Pas-94, No. 4, Jul./Aug., 1975.
Turner, R.D., Superconducting Magnetic Energy Storage for Electric Power System Stabilization; Conference: Proceedings of the 14th Intersociety, Energy Conversion Engineering Conference; Boston, Mass., U.S.A. (5–10, Aug., 1979).
Hassenzahl, W. V.; Will Superconducting Magnetic Energy Storage Be Used on Electric Utility Systems?, IEEE Transactions on Magnets; vol. MAG-11, No. 2; Mar. 1975; pp. 482–488.

Primary Examiner—Morris H. Nimmo
Attorney, Agent, or Firm—Samuel M. Freund

[57] ABSTRACT

The present invention identifies several configurations of conducting elements capable of storing extremely high magnetic fields for the purpose of energy storage or for other uses, wherein forces experienced by the conducting elements and the magnetic field pollution produced at locations away from the configuration are both significantly reduced over those which are present as a result of the generation of such high fields by currently proposed techniques. It is anticipated that the use of superconducting materials will both permit the attainment of such high fields and further permit such fields to be generated with vastly improved efficiency.

26 Claims, 14 Drawing Sheets

APPARATUS FOR STORING HIGH MAGNETIC FIELDS HAVING REDUCED MECHANICAL FORCES AND REDUCED MAGNETIC POLLUTION

The U.S. Government has rights in this invention pursuant to Contract No. W-7405-ENG-36 between the Department of Energy and the University of California.

BACKGROUND OF THE INVENTION

The present invention relates generally to conductor configurations useful for generating magnetic fields having various properties and more particularly to conductor configurations useful for storing magnetic fields which have reduced mechanical forces and give rise to reduced magnetic pollution.

The electrical power industry is subject to a diurnal variation of approximately 25% in power demand. Any generating and distribution capacity, however, must consider daily peak rather than average usage. Load-leveling mechanisms have been suggested which involve storing energy from the grid during slack hours and delivering this energy back into the system during the peak hours. However, such a system must be sufficiently cost-effective as to overcome the capital investment for construction and the operational losses. One such mechanism is Superconducting Magnetic Energy Storage (SMES). Although SMES studies utilizing conventional superconducting materials have been underway for some period, the recent advancement in the area of ceramic materials which become superconducting at temperatures at or above 77K has caused increased interest by the power utilities in SMES technology.

In March of 1987, Bechtel National, Inc., released a study entitled "Superconducting Magnetic Energy Storage for Electrical Utility Load Leveling: A Study of Cost vs. Stored Energy," which focused on the ring configuration shown in FIG. 1 thereof. In the device shown, electrical current is generated in 556 composite aluminum/superconducting coil elements, each of which carries 200,000 A and stores 5000 MWh of energy. The construction cost of such a device was estimated to be about 800 million dollars. The coil would be 500 m in radius and the 10 G safety fence would be located at 2610 m radius. The magnetic field induced stress on the ring, or hoop stress, is borne by placing the entire structure in a supporting trench. One purpose of the Bechtel design was to adjust the design parameters to reduce this stress such that it could be accommodated by soil rather than by rock. Although the resulting coil would be physically larger, the increased flexibility in location of the coil along with some savings resulting from the less expensive trenching operation in soil as opposed to rock, somewhat mitigated the size consideration. Nevertheless, even under the predicted reduced stress conditions, the magnetic force at the superconducting outer rim would be 0.5 MPa or about 5.2 tons/ft$^2$ at full coil storage. Still another difficulty with this design is the severe magnetic pollution predicted to exist at large distances from the ring structure. Such magnetic fields would have a significant affect on magnetic compass navigation instrumentation in airplanes, and perhaps have environmental side effects, such as affecting the migratory patterns of birds and dolphins.

Two publications addressing the subject of locating stationary states of flowing systems with sources having localized logarithmic potentials describe solutions to that problem which are mathematically equivalent in some instances to that of finding low force configurations of electric current carrying wires. In "Stationary Configurations Of Point Vortices And Other Logarithmic Objects In Two Dimensions," by L. J. Campbell and James B. Kadtke, Phys. Rev. Letters 58, 670 (1987), and in "Method For Finding Stationary States Of Point Vortices," by James B. Kadtke, and L. J. Campbell, Phys. Rev. A 36, 4360 (1987), the authors show equilibrium (force-free) configurations. Such configurations would yield zero magnetic forces if the vortices depicted therein were replaced by straight wires having electric current flow in the directions indicated. However, there is no teaching or identification by the authors of any relationship between the abstract formalism presented and low magnetic force obtainable in certain electric conductor configurations. In fact, the problems specifically addressed are vortex lines, line charges, and parallel screw dislocations.

Accordingly, it is an object of the present invention to identify conductor configurations having low net force on the conductors for storing energy in the form of magnetic fields.

Another object of the present invention is to identify conductor configurations having low net force on the conductors for storing energy in the form of magnetic fields where the magnetic flux pollution to the environment is minimized.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects and in accordance with the purpose of the present invention, as embodied and broadly described herein, the magnetic energy storage apparatus of this invention may include a set of substantially parallel, electrically isolated, elongated conducting elements having electrical currents flowing therein, spaced apart in a substantially equally distant manner around the surface of a cylinder, and a center conductor, disposed substantially parallel to each conductor in the first set of conductors along the axis of the cylinder and having an electrical current flowing therein in a direction opposite to the direction of the current flowing in the first set of conductors, wherein the ratio of the magnitude of the current flowing in each conductor of the set of surface conductors to that flowing in the center conductor is selected such that the net force on the conducting elements is substantially zero away from the ends thereof.

In another aspect of the present invention, in accordance with its objects and purposes, the magnetic energy storage apparatus hereof may include a substantially planar set of substantially parallel, equally spaced, electrically isolated, elongated, electrically conducting elements having electrical current flowing in opposite directions in adjacent members, wherein current flowing in those conducting elements disposed in the proximity of the outer boundary of the set is smaller than the current flowing in the conducting elements located interior to this boundary, and at least two substantially parallel, electrically isolated end electrical conductors associated with each end of each of the conducting elements for carrying the current from one conducting element to the conducting element adjacent thereto.

In a further aspect of the present invention, in accordance with its objects and purposes, the magnetic energy storage apparatus of this invention may include a first set of electrically isolated, elongated conducting elements each having an electrical current flowing in a chosen direction, and a second set of electrically isolated, elongated conducting elements each having an electrical current flowing in a direction opposite to the electrical current flowing in the first set of conducting elements, disposed in such a manner that the nearest neighbor of each electrical conducting element of the first set is a conducting element from the second set, the conducting elements located closest to the edge carrying lower electrical current than those located interior to the sets.

In still another aspect of the present invention, in accordance with its objects and purposes, the magnetic energy storage apparatus hereof may include a set of electrically isolated, approximately circular conducting rings disposed such that the axis of approximate symmetry of each conducting ring is substantially colinear with the axis of the nearest circular conducting ring thereto, each of the conducting rings having an electric current flowing in the opposite direction to the electric current flowing in its nearest neighbors.

In yet another aspect of the present invention, in accordance with its objects and purposes, the magnetic energy storage apparatus hereof includes an array of equally spaced, helically wound elongated conductors, each conductor carrying the same current, but alternate conductors carrying current in the opposite direction.

Benefits and advantages of the present invention include the ability to store substantial energy in the form of magnetic fields in conductor configurations in which the net mechanical forces on these conductors have been significantly reduced, and from which the magnetic field pollution outside of the conductor configuration is significantly reduced over that which is present in proposed magnetic field storage apparatus.

BRIEF DESCRIPTION OF THE DRAWINGS

The accompanying drawings, which are incorporated in and form a part of the specification, illustrate several embodiments of the present invention and, together with the description, serve to explain the principles of the invention. In the drawings:

FIG. 4a is a schematic representation of the planar, four-conductor configuration shown in FIG. 3a hereof, except that the return current is divided among four end conductors. This substantially reduces the force on each conductor as is shown in FIG. 4b hereof, where the calculated net force generated on the end electrical conductors is presented, when compared with a calculation of the force to the same scale illustrated in FIG. 3b hereof. The height of the curves is proportional to the net force on each end conductor associated therewith. However, the net total force on the two arrays is similar.

DETAILED DESCRIPTION OF THE PREFERRED EMBODIMENTS OF THE INVENTION

Reference will now be made to the present preferred embodiments of the invention, examples of which are illustrated in the accompanying drawings. Briefly, the present invention identifies several configurations of conducting elements capable of storing extremely high magnetic fields for the purpose of energy storage or for other uses, wherein forces experienced by the conducting elements and the magnetic field pollution produced at locations away from the configuration are both significantly reduced over those which are present as a result of the generation of such high fields by currently proposed techniques. It is anticipated that the use of superconducting materials will both permit the attainment of such high fields and further permit such fields to be generated with vastly improved efficiency.

Having generally described the invention, the following examples set forth the details of specific embodiments thereof.

EXAMPLE I

There are configurations of conductors for which the sum of the local magnetic forces exerted on each conductor can be made small. By local forces it is meant the forces created by long, straight conductors on one another. There are forces exerted on the wires by return currents, but these forces can be made small by removing the return currents to some large distance. Magnetic pollution is significantly reduced if there are only small net currents flowing in the configuration.

Figure 1:
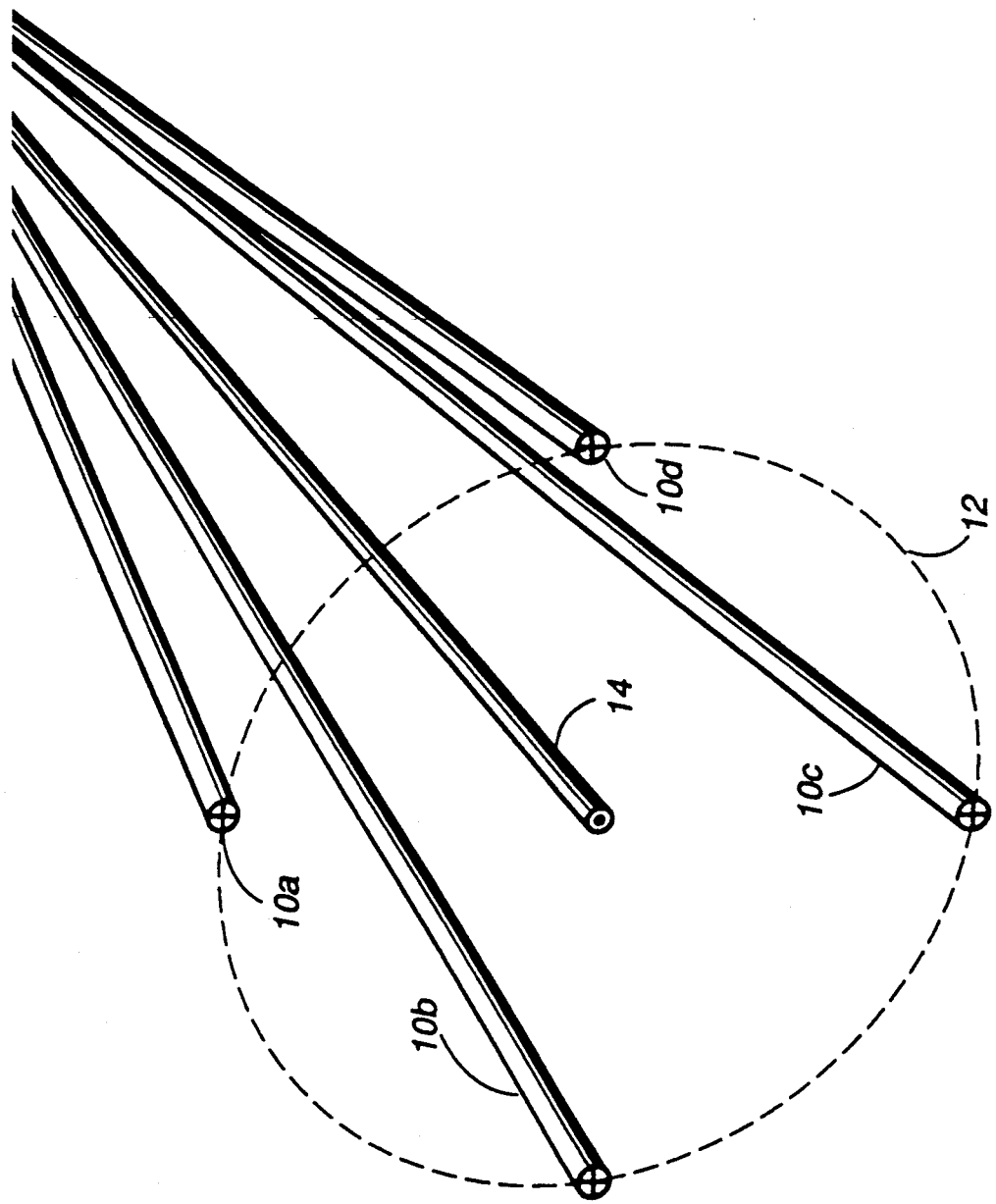
FIG. 1 is a schematic representation of a configuration of five conductors for which the sum of the magnetic forces exerted on each conductor by the others is approximately zero. Four elongated, equally spaced parallel conductors disposed about the surface of a cylinder, and one conductor lying along the axis of the cylinder is illustrated. This apparatus generates significant magnetic pollution since there is a net current flowing in the conductors which must be returned to the current supply.

Reference will now be made in detail to the present preferred embodiments of the invention, examples of which are illustrated in the accompanying drawings. Similar or identical structure is identified using identical call-outs. A configuration for storing magnetic energy which has zero local forces on the wires is shown in FIG. 1 which is a schematic representation of a five-conductor device. Generally straight wires 10a–d are disposed in a parallel manner about the surface of an imaginary cylinder 12 and have approximately the same electrical current flowing in the same direction. Generally straight wire 14 is disposed along the axis of imaginary cylinder 12, is parallel to the wires 10 lying on the surface of the cylinder, and has an electrical current flowing in the opposite direction thereto. Depicted by an "x" in FIG. 1, current flows into the plane of the Figure for wires 10, and out of the Figure for wire 14, as depicted by a dot. In order for the net forces on conductors 10 and 14 to be zero, away from the ends thereof, the magnitudes of the electrical currents flowing therein are related by the algorithm $I_c/I_o(N_o-1)/2$, where $I_c$ and $I_o$ are the magnitudes of the currents flowing in center conductor 14, and in each of outer conductors 10a–d, and $N_o$ is the number of outer conductors located on the surface of the cylinder. Although four wires 10 are illustrated, any number of conductors may be employed. The radius of the cylinder is unimportant, and it would be apparent to one having ordinary skill in the art of magnetic devices that the linear configuration illustrated in FIG. 1 could be formed into a circular configuration in order to avoid the necessity of returning the current on external conductors. It should be mentioned that forces on the wires in the linear configuration exist in the region of the introduction and removal of current from the device. These forces appear as radial hoop forces on the circular structure, which can be made small if the device radius is made large.

Figure 2A:
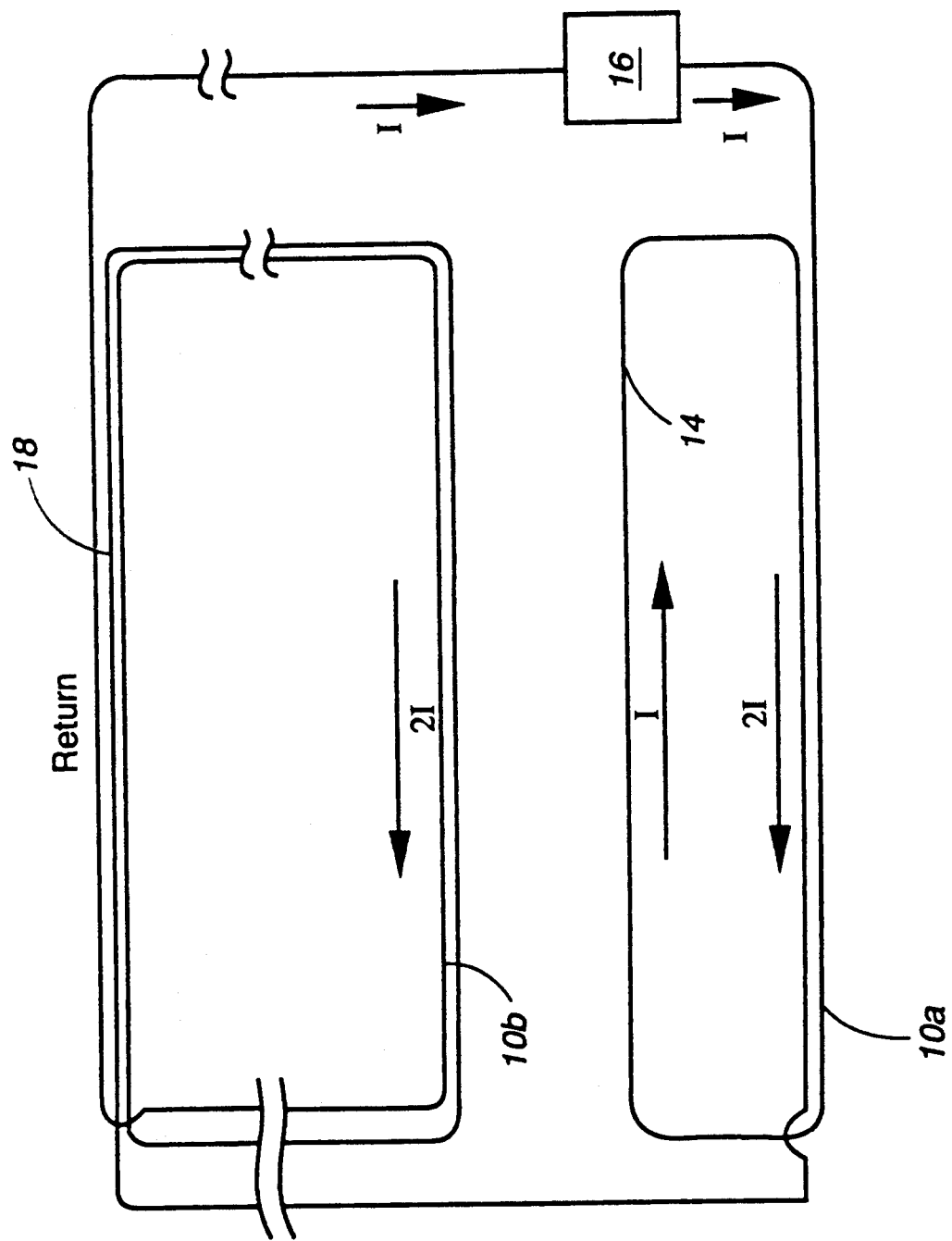
FIG. 2a is a schematic representation of a planar, three-conductor configuration having approximately zero net local forces on the conductors. The conductors are elongated and substantially parallel, and represent a special case of the more general apparatus illustrated in FIG. 1 hereof.

FIG. 2a hereof shows a planar, special case of the more general zero-force configuration illustrated in FIG. 1, which has been reduced to practice to demonstrate the principles of the present invention. In this device, two generally parallel wires 10a and 10b, having approximately the same current flowing in the same direction, are located on either side of and equally distant from wire 14 and disposed parallel to wires 10a,b such that the three wires lay in the same plane. Wire 14 carries a current one-half that of either of wires 10a or 10b in a direction opposite to the current in these wires to achieve a zero net force on each wire, as is prescribed using the algorithm set forth hereinabove. One manner in which the above-described current flow may be achieved with a single output current supply is by selecting the ratio of the number of separate, 30 electrically isolated conducting strands for each of wires 10a, 10b, and 14 as follows. Wires 10a and 10b have twice the number of isolated conducting strands as does wire 14. In the simplest situation with wires 10a and 10b having two electrically isolated conducting strands and wire 14 having one, current supply 16 produces current I which is then distributed with current 2I flowing in each of wires 10a and 10b and current I flowing in the opposite direction in wire 14, if the current from one conducting strand of wire 10a is caused to flow into conductor 14, and the output of conductor 14 is returned to the second strand of conductor 10b. There is a net current in this configuration of conductors which must be returned to current supply 16. This can be achieved without significantly affecting the zero net force on conductors 10a,b and 14 if the return conductor 18 is located far away from these conductors. However, this configuration generates significant magnetic pollution because of the net current flow which is returned in two conducting pathways. It should be mentioned that there are internal forces generated in the return conductor bundle 18, here shown having three, electrically isolated conducting elements which may be large, depending on the current. However, the forces tend to bring the conductors together since the current flows in the same direction in each conductor of the bundle, and this causes no displacement force.

Figure 2B:
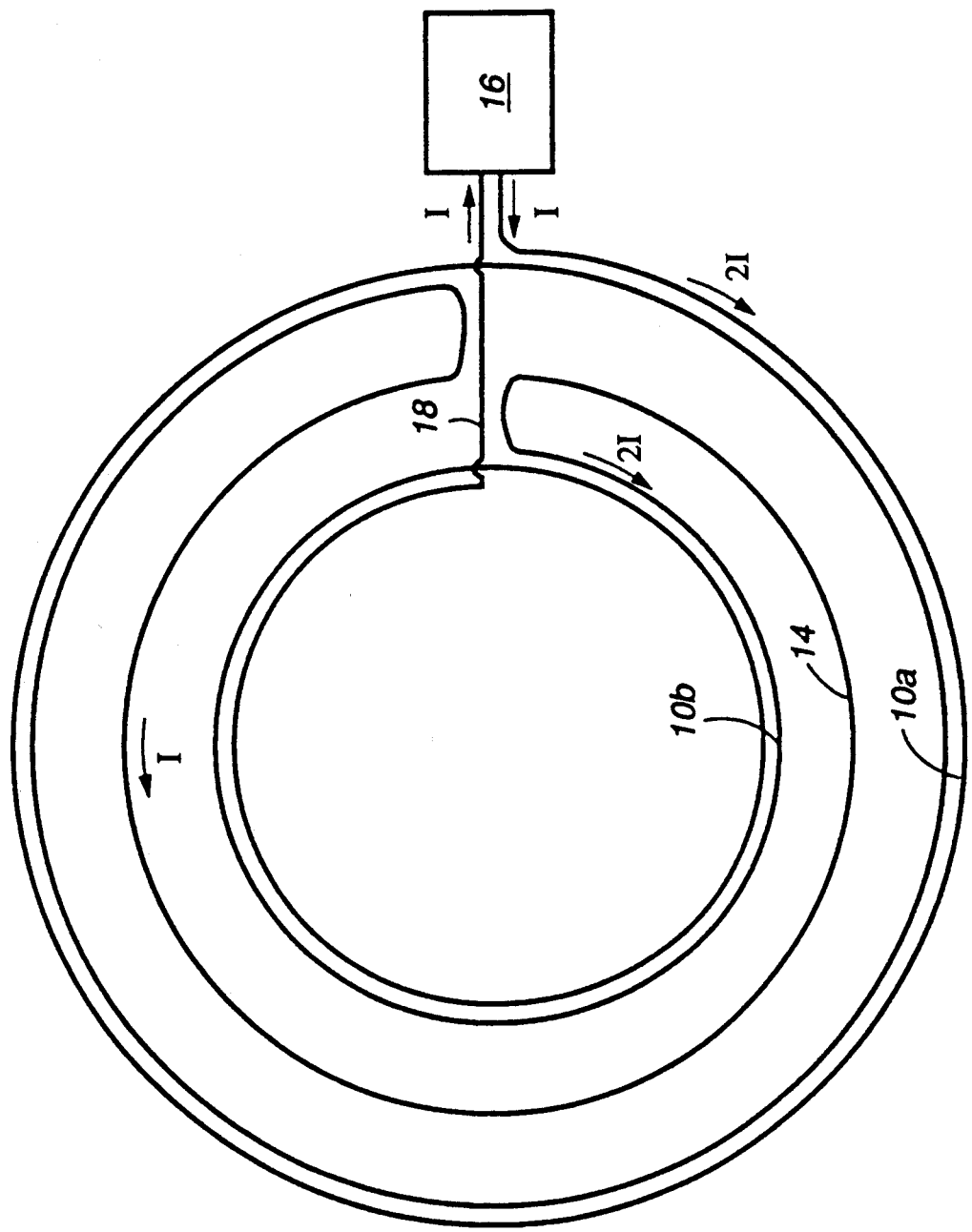
FIG. 2b is a schematic representation of the planar, three-conductor configuration shown in FIG. 2a hereof, wherein the entire structure is formed into a circle, thereby significantly reducing the length of the current return conductors.

FIG. 2b illustrates one procedure for reducing return conductor bundle 18 to but a single conductor, and considerably shortening its length.

EXAMPLE II

Figure 3A:
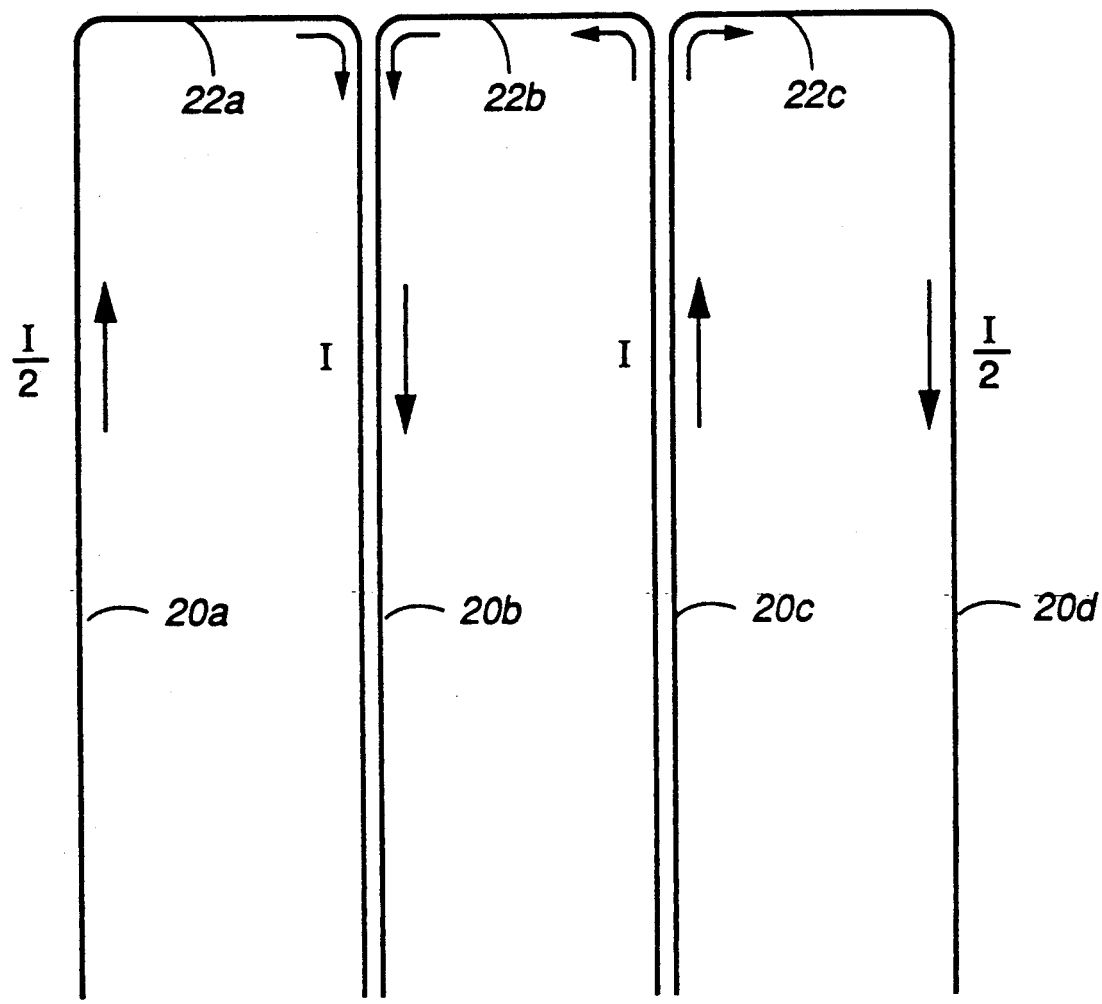
FIG. 3a is a schematic representation of a planar, four-conductor configuration having substantially complete cancellation of the net magnetic forces on each conductor. The conductors are equally spaced, elongated and substantially parallel. Approximately equal electrical currents are caused to flow in opposite directions in the two center conductors, while one-half of this current flows in the outer conductors. There are, however, significant forces generated by the end electrical conductors which return the electrical current to the principal conductors as is shown in FIG. 3b, where the calculated net force on each end conductor and on the principal conductors is presented. The force on the conductors is proportional to the height of the curve associated therewith.

A configuration suitable for magnetic energy storage in which there is a partial cancellation of the magnetic forces on conducting elements is shown in FIG. 3a. Therein, a substantially flat, rectangular array of four equally spaced, elongated, parallel electrical conductors 20a–d is schematically illustrated. Approximately equal electrical currents flow in opposite directions in interior principal conductors 20b and 20c, thereby causing these conductors to repel one another. Outer principal conductors 20a and 20d carry one-half the current of the interior principal conductors. In order to provide the requisite relationship among the current in the principal conductors, one embodiment of our invention has the interior principal conductors constructed as a bundle of electrically isolated, parallel conductors. Since parallel wires carrying currents in the same direction attract one another, such bundles of conductors need not be bound. This is schematically illustrated in FIG.

Figure 3B:
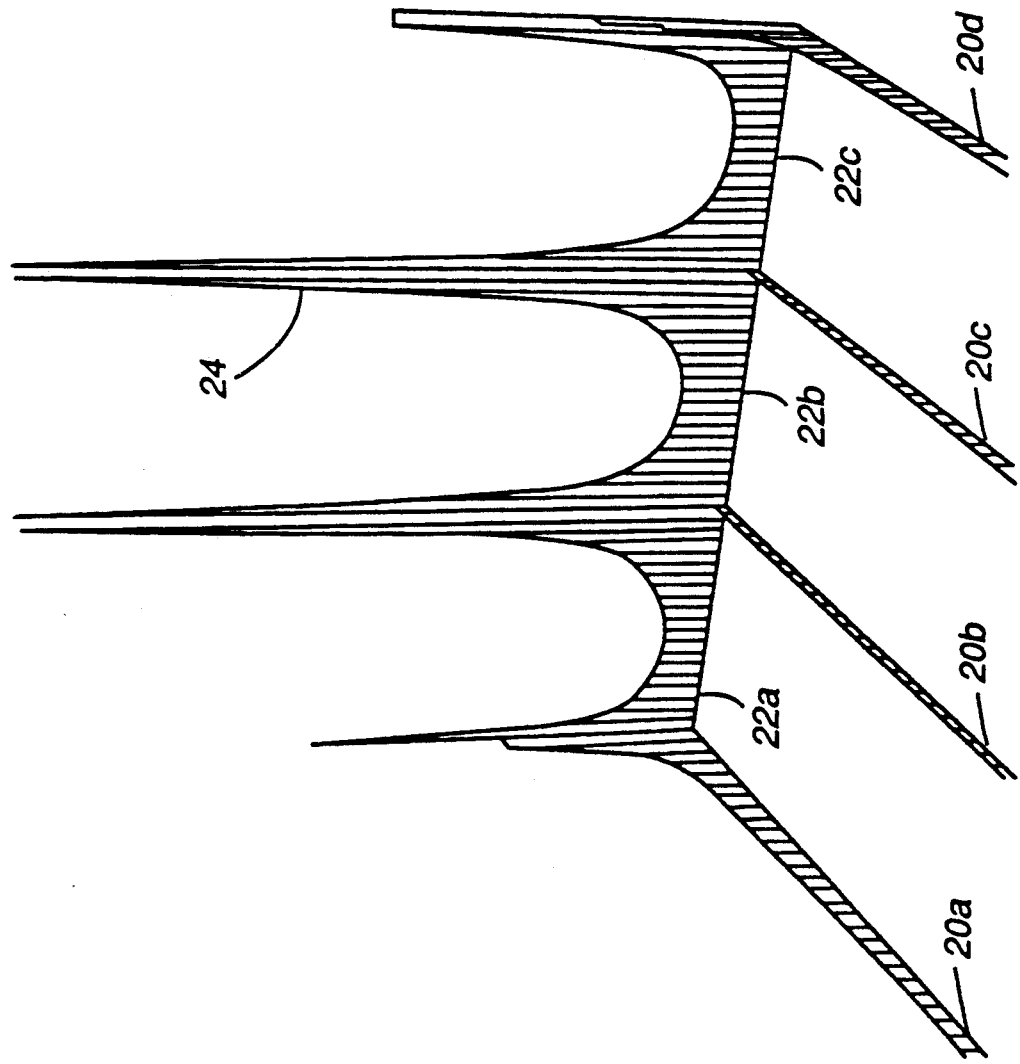
Figure 4A:
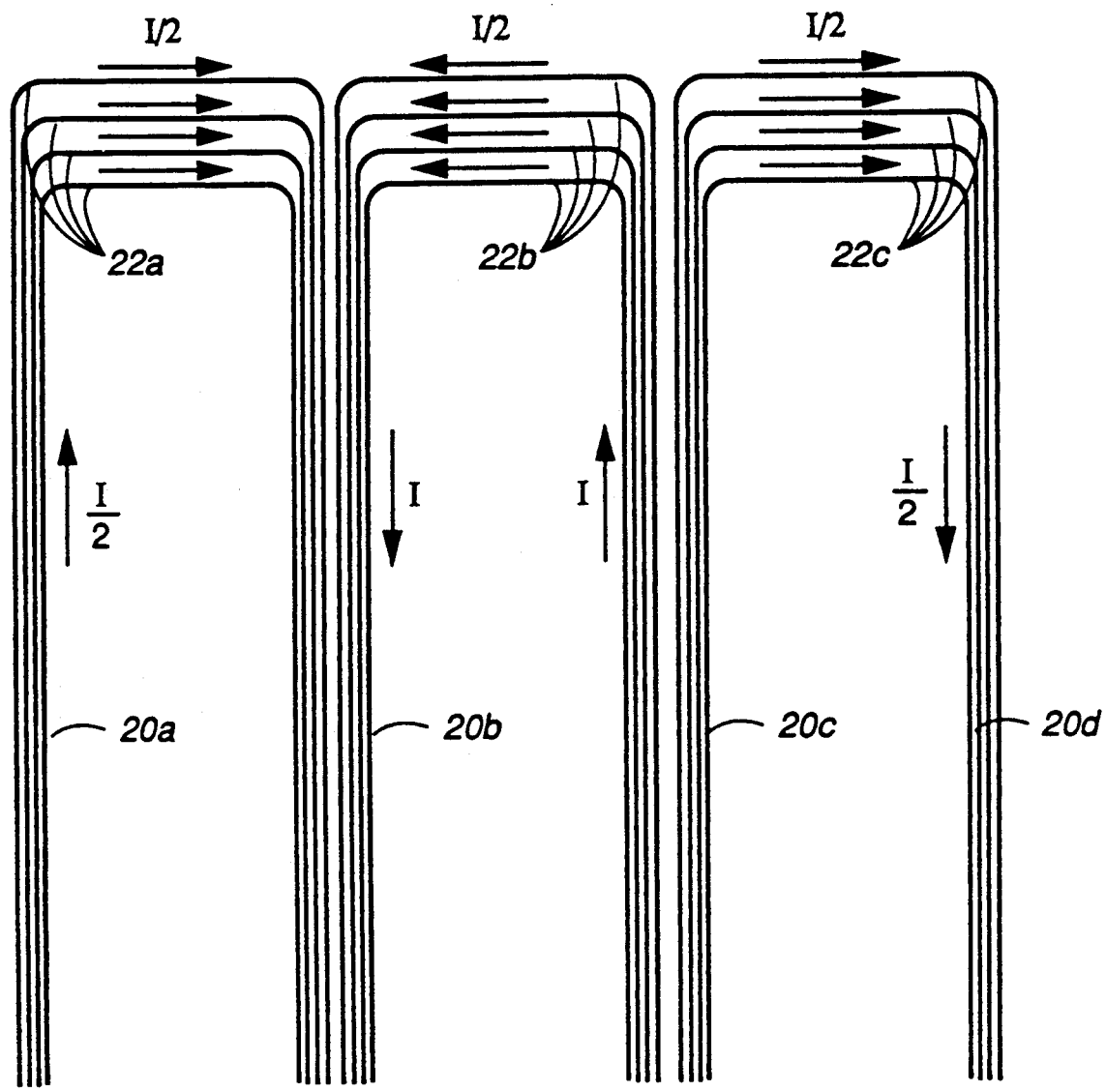
Figure 4B:
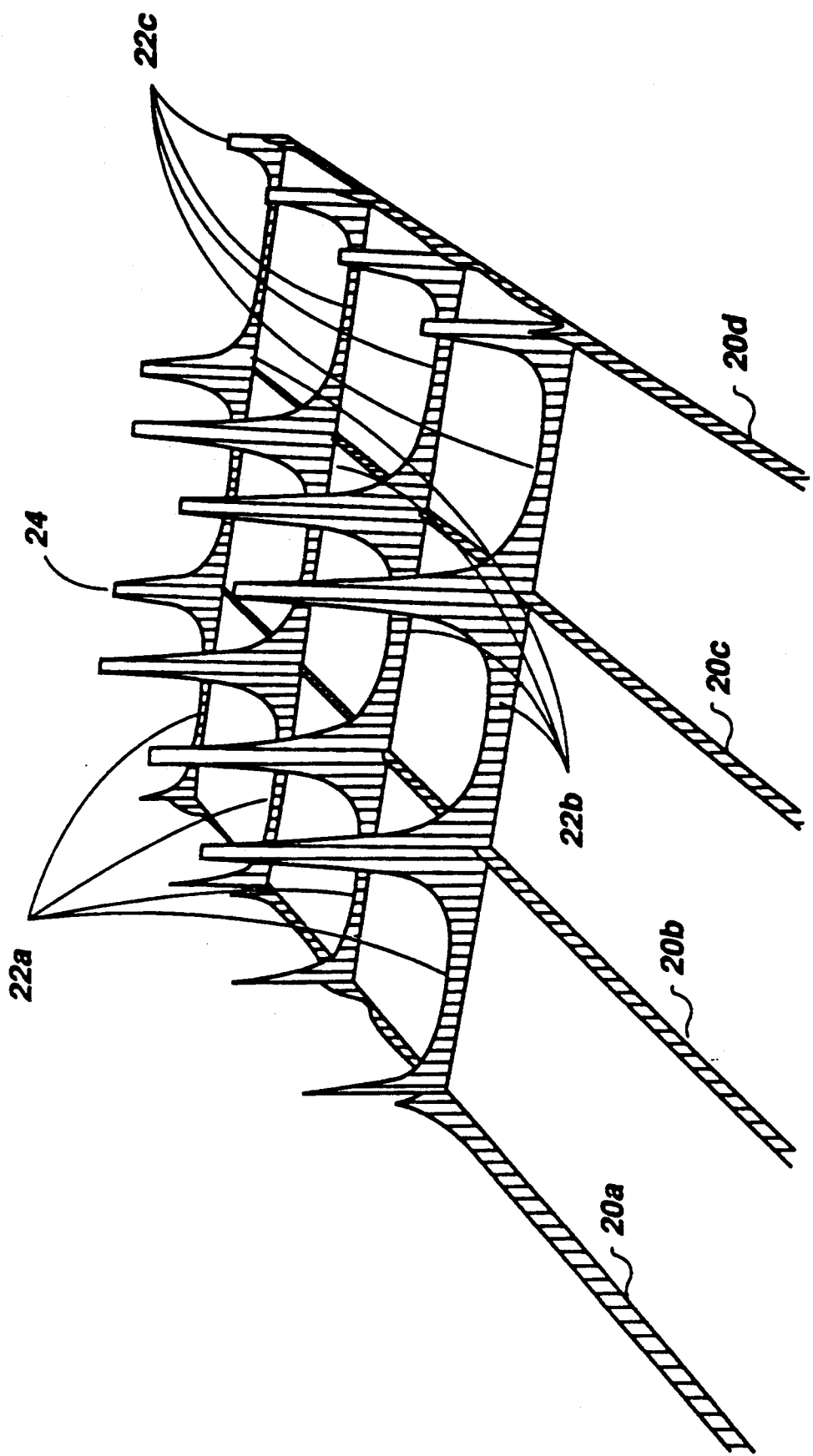

3a hereof. Clearly, other apparatus may be identified to provide the requisite relationships among the currents. More complete cancellation of the forces on the interior principal conductors can be achieved by adding more conductors, which will be discussed hereinbelow. One difficulty with the configuration illustrated in FIG. 3a is the large forces exerted on the end electrical conductors 22a-c which return the current to the parallel elongated principal electrical conductors. FIG. 3b illustrates the calculated forces on such conductors for the four-wire array shown in FIG. 3a. The height of the curves 24 is proportional to the magnitude of the force on that part of the conductor when a single end conductor 22a-c is employed to carry the current. By adding additional end conductors, these forces may be considerably reduced, although the sum of the forces on the totality of end conductors remains approximately the same as that for the single end conductor apparatus illustrated in FIG. 3a hereof. This effect is illustrated in FIGS. 4a and 4b, which schematically depict four end conductors comprising each of return conductors 22a-c for each pair of conductors 20a-d in the flat array. Net forces on the end conductors 24 are clearly reduced from those depicted in FIG. 3b hereof. As can be seen from FIG. 4a, each interior principal conductor is composed of eight, electrically isolated conductors, while the outer principal conductors are composed of four electrically isolated conductors in this illustrated embodiment of the planar array. As shown, each of the end conductors carries one-eighth of the current, I, each interior principal conductor carries current, I, and each of the two outer principal conductors carries one-half of the current, I.

Figure 5:
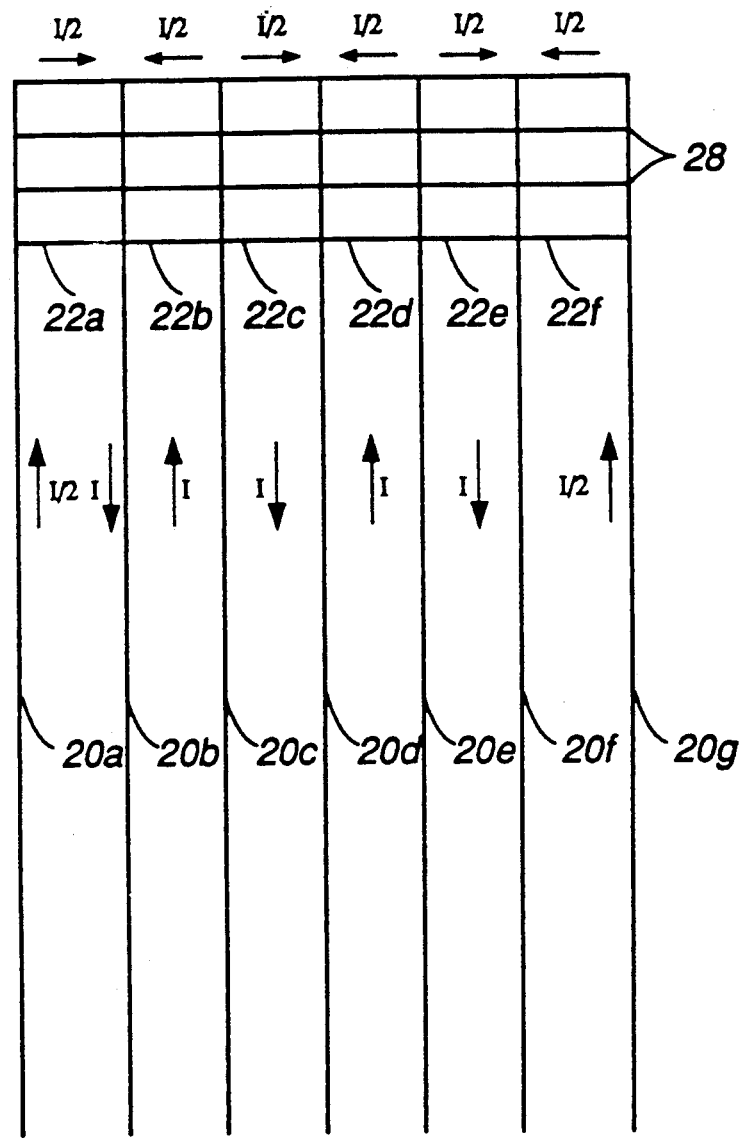
FIG. 5 is a schematic illustration of the more general planar configuration of conductors having reduced force on each conductor in the array. Each of the interior conductors has current having the same magnitude flowing in the opposite direction from that of its nearest neighbors. The two outer conductors carry one-half of the current carried by the interior conductors. Four end conductors are illustrated which reduces the force on each of the conductors. Each of the conductors illustrated in FIG. 5 may be composed of a number of electrically isolated smaller conductors as illustrated in FIGS. 3a and 4a hereof.

FIG. 5 schematically illustrates a more general planar configuration compared to that illustrated in FIG. 4a hereof. Large forces are generated in the proximity of the outer conductors 20a and 20d in FIG. 4a as the current is increased, since the cancellation is incomplete, while the cancellation of forces for interior principal conductors is improved. However, the forces on these conductors can be reduced by adding additional outer conductors having considerably reduced currents. It can be shown that a 21 conductor array of the type illustrated in FIG. 3 hereof can store five times as much magnetic energy as a ring having the same dimensions, wherein all of the conductors carry current in the same direction and the force on the conductors is the same for the two structures. By gradually increasing the magnitudes of the currents in the central conducting elements of the rectangular array, additional magnetic energy can be stored. It can be shown that sharp corners 28 and straight conductor segments in the location of the connection between the end conductors 22 and the principal conductors 20 give rise to smaller forces than gradual current transitions in conductors with smoothly varying connections, since for the gradual transitions, electrical currents depart the region of the principal conductors, which generate large magnetic fields, over a greater distance of significant interaction with these fields.

Another important feature of the flat array is the reduction in magnetic pollution. At a distance of 1000 m from the center of a ring having the same magnetic energy stored as a flat array shown in FIG. 4 hereof having 21 conductors, the magnetic field is twenty times that for the flat array. It can be shown that the magnetic field external to a ring device drops off as the reciprocal of the distance squared, while for the flat array, the relationship is the reciprocal of the distance cubed for an odd number of conductors.

EXAMPLE III

Figure 6:
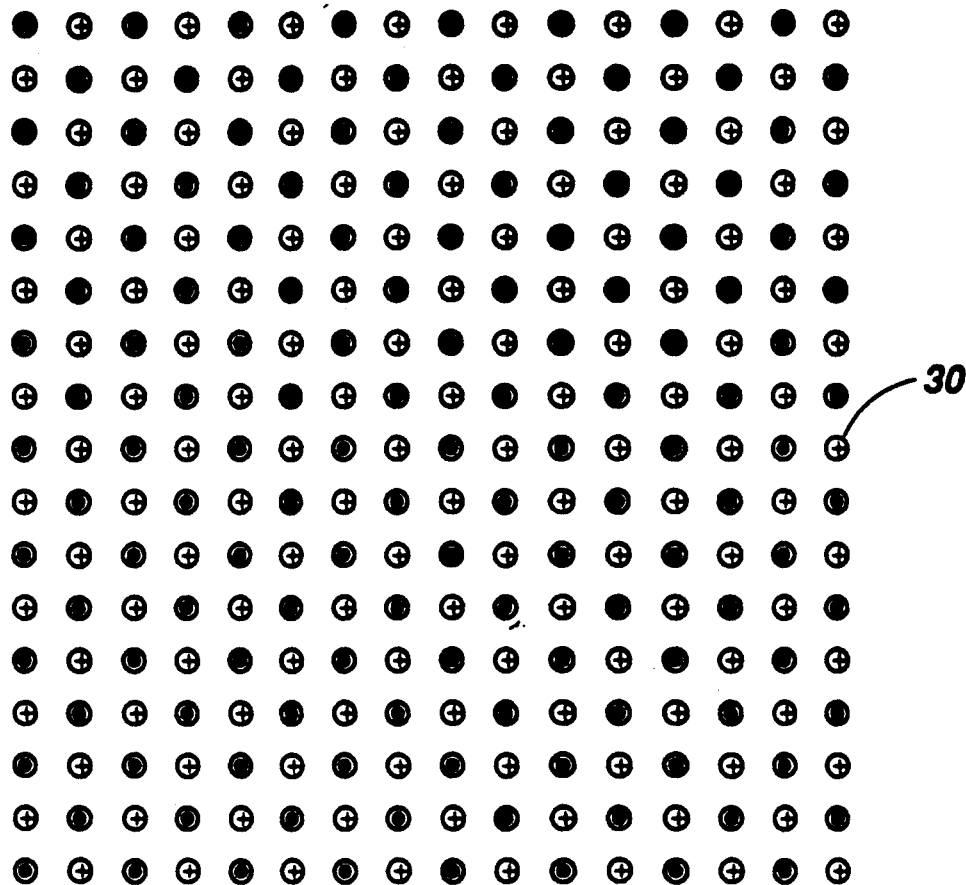
FIG. 6 is a true end-view schematic representation of a 16×16 array having a generally rectangular cross section of electrical conductors. The conductors are elongated and substantially parallel, and approximately equal electrical currents flow in opposite directions in nearest neighboring conductors, generating a net force on each conductor. The elongated array is intended to be placed along the ground perhaps in an overall circular configuration.

Another low-force configuration useful for magnetic energy storage, and one which the configuration shown in FIGS. 3-5 hereof is a special case of, is shown in FIG. 6. Therein, a cross section of a $16 \times 16$ array 30 of substantially equally spaced, elongated electrical conductors disposed substantially parallel to one another is schematically described. In the simplest embodiment of the rectangular array, electrical current flow in each conductor is approximately the same. Alternate conductors have current flowing in opposite directions as illustrated in FIG. 6 with a plus indicating flow into the plane of the Figure, and a dot indicating flow out of the plane thereof.

Figure 7:
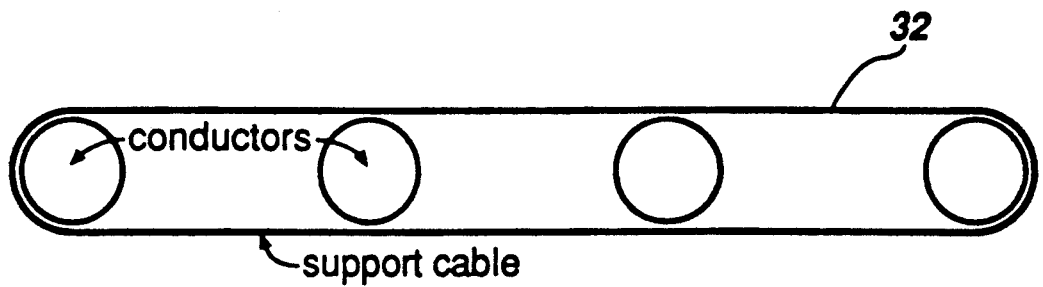
FIG. 7 is a schematic representation of a 1×4 array of electrical conductors, as a special case of the more general rectangular array illustrated in FIG. 6 hereof. Shown is a means of binding the elongated conductors at various locations along the length thereof in order to compensate for the net repulsive force generated within the array tending to separate the conductors.

FIG. 7 illustrates a simplification of one horizontal layer of array 30. Forces tending to push the conductors apart can be compensated for by simply binding the conductors together at various points along the length of the array utilizing support cables 32. Of course, vertical cables would provide constraint in the vertical direction.

The array can be formed into a circular pattern. For example, a one kilometer diameter ring consisting of 256, 10 cm radius conductors each carrying 10,000,000 A spaced 1 m apart, with alternate conductors carrying current in opposite directions, has a stored energy of about $1.8 \times 10^{13}$ J. The magnetic field at the surface of each conductor is 200,000 G, and the current density is approximately 31,831 A/cm$^2$. If standard superconducting materials are to be employed, the radii of the conductors must be increased to reduce the magnetic fields at the surface thereof.

Forces on the interior conductors are small, but the force on each edge conductor is about $5 \times 10^6$ N/m (500 tonne/m). The force on each corner conductor is about 2.5 times larger yet. Hoop stresses on the ring (outward radial forces) are quite small. If the current in the edge conductors is reduced to one-half of that carried by the interior conductors, and the corner conductors are made to carry one-fourth of the current carried by the interior conductors, the magnetic pollution of the apparatus 100 m from the ring may be reduced from about 2 G to 0.01 G. Moreover, the forces on the edge conductors are reduced to one-half of the former quoted value, but the second row from the outside experiences increased forces, so that the net force is about the same. However, the forces on the corner conductors is substantially reduced.

Magnetic pollution can be shown to vary as the reciprocal of the distance from the center of the apparatus cubed for even numbers of rows and columns of conductors in a square array. For an odd number of rows and columns arranged in a square array, though, the magnetic pollution is reduced by a factor of 100 at 100 m, and decreases as the reciprocal of the distance from the center of the ring to the fifth power. Rectangular arrays having odd by even configurations display a field variation depending on the reciprocal of the distance from the center of the ring to the fourth power.

EXAMPLE IV

Figure 8:
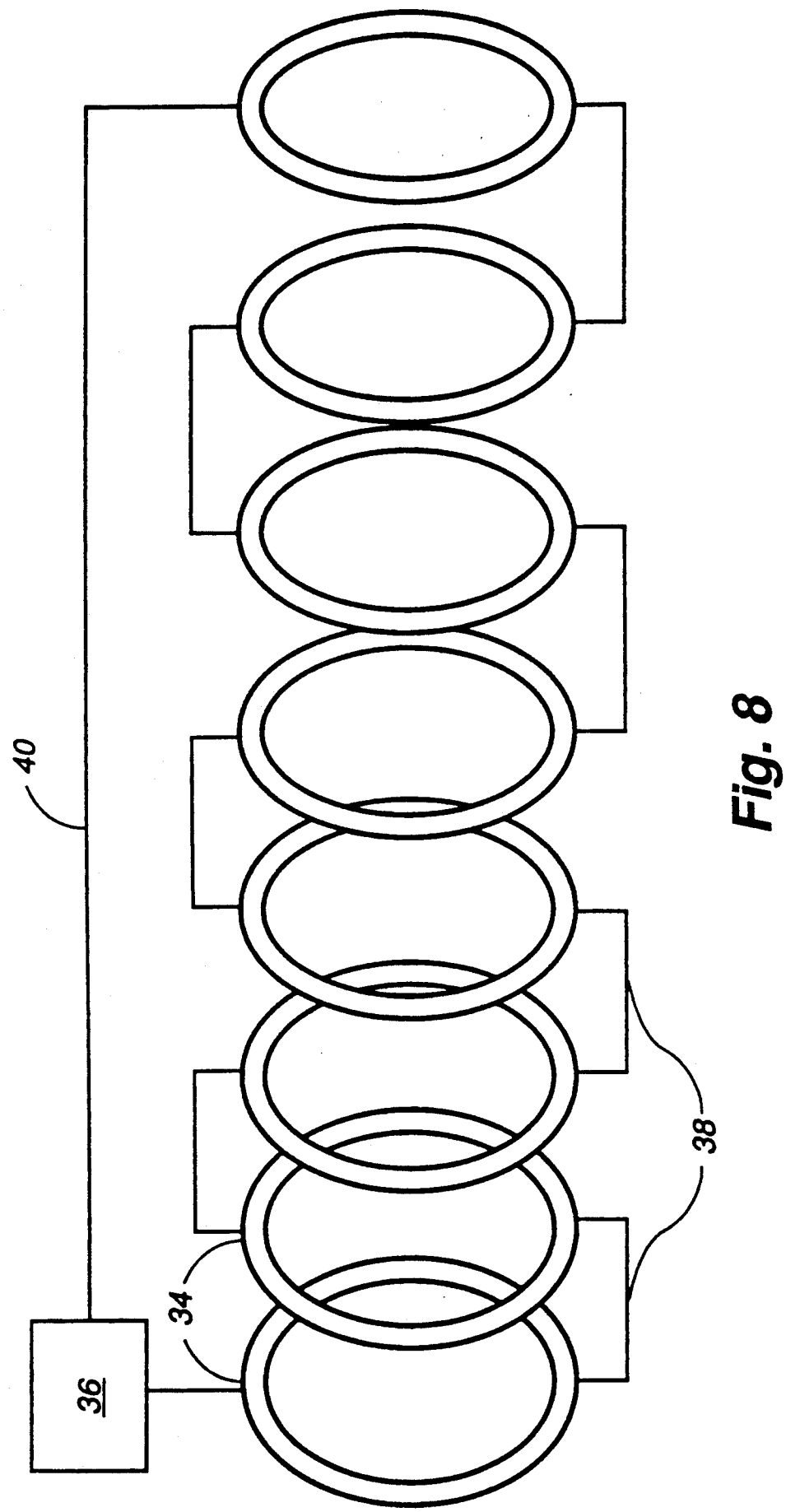
FIG. 8 is a schematic representation of a series of rings stacked along a common axis.

The analysis of the magnetostatics of the fields and the forces on rings is more complicated than that of straight conductors. However, ring structures do not have the return current problem that straight conducting configurations share. A configuration of stacked electrically conducting rings, each having an electrical current flowing in a direction opposite to its nearest neighbors, is schematically illustrated in FIG. 8. In such a configuration, there is a loss of about a factor of two in overall energy storage capacity in exchange for reduced forces. Fortunately, for some configurations, the forces can be reduced at a faster rate than the energy storage. Moreover, the direction of the forces on individual conductors changes from purely radial, as in the case of a single ring, to one which reflects a component of force in the axial direction. By restricting configurations to those having small return currents, the magnetic pollution problem can be significantly reduced for systems of rings having oppositely directed current flow.

For magnetic energy storage systems, it would appear counterproductive to design structures having opposite currents, since, as mentioned above, such an arrangement always lowers the total energy capable of being stored. However, since the forces depend both on the quantity of stored energy and the configuration, it is a complicated matter to determine whether a particular design is achieving the desired goal. The most attractive engineering design will be that configuration which gives the maximum, stored energy and the minimum required pressure to retain the structure, while meeting the conditions that the current density be below the critical current density for the conductors involved and that the magnetic pollution outside of the structure be minimal. Therefore, one may define a figure of merit, $S = (U_O/P_O)(J_O/H_O)^3$, where $U_O$ is the total stored energy, $H_O$ is the magnetic field at distances far from the structure, $P_O$ is the pressure require-d to contain the structure, and $J_O$ is the current density. S is independent of scaling factors such as the size of the system. To further illustrate the properties of the ring arrangement of the present invention, one may relate the figure of merit, S, to a similar quantity for a Bechtel-like ring. Thus, $S_r = S/S_{Bechtel}$, where $S_r$ is the ratio of the two figures of merit, is a number more readily understood. Typical values for $S_r$ are greater than 50,000, since the external magnetic pollution of the present invention is quite small due to the cancellation of the external fields from currents flowing in opposite directions. However, as stated, this consideration is of significant importance in the utilization of magnetic energy storage systems. If one eliminates any consideration of magnetic pollution; that is, if one does not weight the figure of merit toward environmental effects ($S_O = U_O/P_O$), a seven-ring configuration, having approximately equal electrical current flowing in opposite directions in neighboring rings would have a typical value for the figure of merit of about 5.

FIG. 8 is a schematic representation of a series of ring conductors 34 stacked along a common axis. A magnetic field suitable for magnetic storage results if the rings have approximately the same diameter, carry about equal, but opposite electrical currents from those of their nearest neighbors, and are spaced approximately a radius apart along the axis. As the rings are separated further, the magnetic energy storage capability of the system increases, since the cancellation of the magnetic fields is reduced. However, the resulting radial forces on each ring increase, while the axial forces are reduced. It should be mentioned that for a large number of rings, the axial forces on the rings near the center of the apparatus tend to be quite small, whereas those appearing on the outer rings can be sizable. This effect may in part be compensated by reducing the electrical currents carried by the outer rings.

In FIG. 8, current supply 36 and connecting loops 38 illustrate one manner of placing rings 34 in electrical connection using but a single current supply. A considerable reduction in forces generated on the end rings of the apparatus is achieved by causing only one-half of the current to flow in the outer rings thereof; that is, in one ring at each end of the apparatus. As the number of rings increases, the axial forces on the interior rings rapidly approach zero, while those on the outer elements increase due to incomplete cancellation. The forces on the outer rings can be reduced by reducing the current carried thereby. It should be apparent to one having ordinary skill in the art of magnetic coils that each conducting ring 34 should include a plurality of windings in order for the connecting loops 38 to have significance as illustrated. The stacked ring configuration shown in FIG. 8 hereof may be formed into a circular configuration which reduces the length of return current path 40, but introduces hoop forces in place of axial forces on the rings, and generates small radial forces thereon. The hoop forces may be reduced if the apparatus is constructed having a large circular diameter.

Figure 9A:
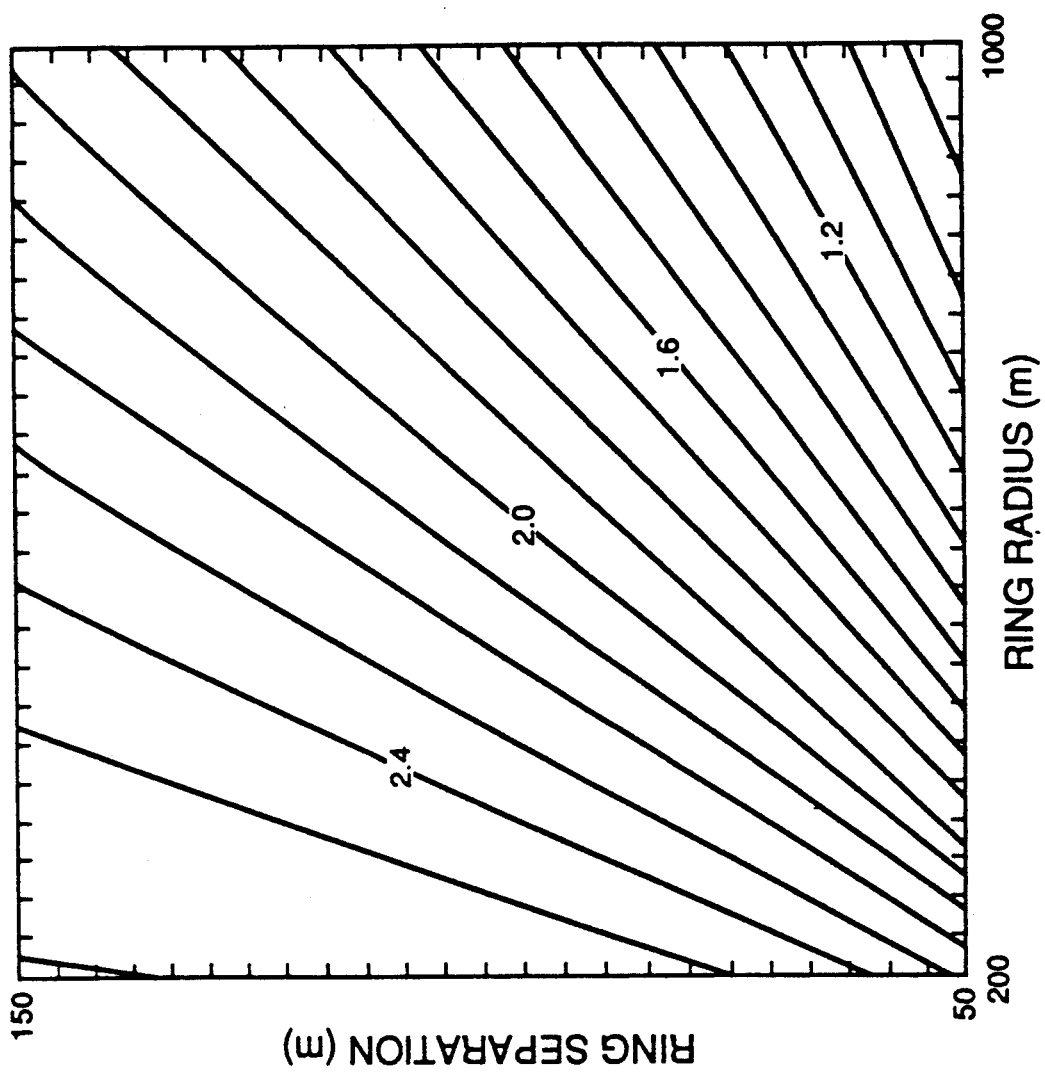
FIGS. 9a-c show the calculated log base 10 figures of merit as a function of ring spacing and ring diameter for arrays comprising 3, 5, and 7 rings, respectively, in the relationship illustrated in FIG. 8 hereof.
Figure 9B:
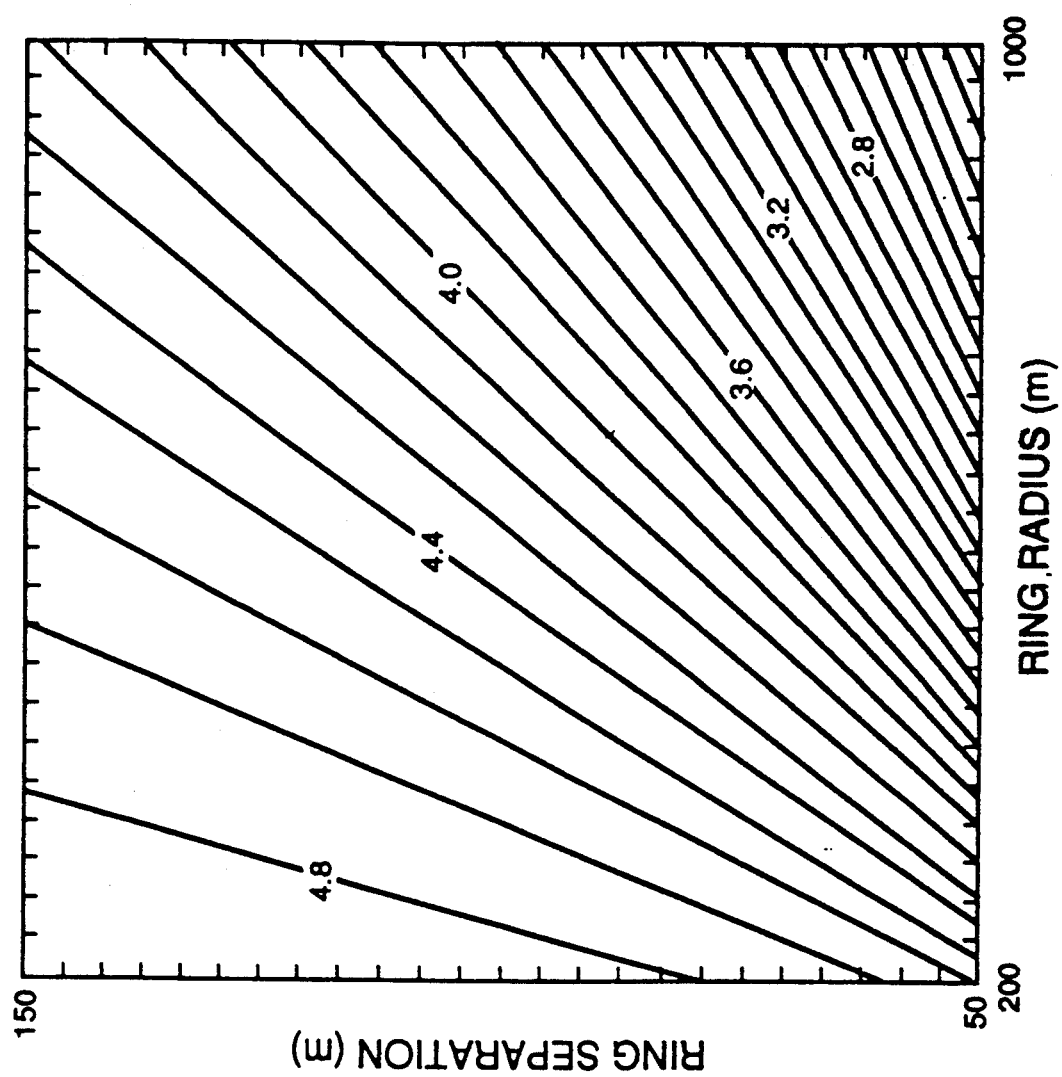
Figure 9C:
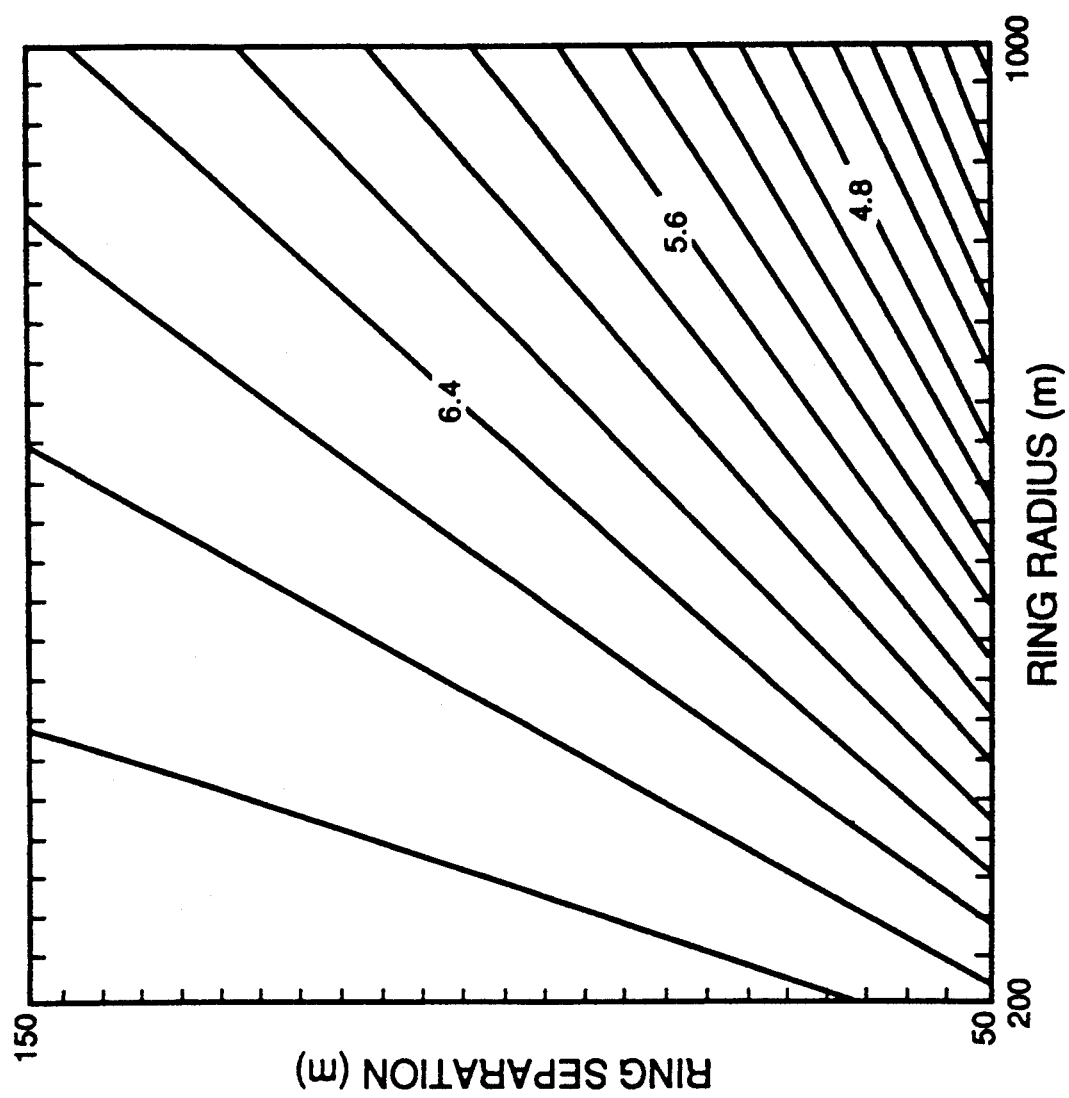

FIGS. 9a–c are $\log_{10}$ plots of $S_r$ versus ring radius in meters and ring separation in meters for three-, five-, and seven-member ring configurations. It may be observed that increasing values of $S_r$ result as the number of rings is increased.

Figure 10:
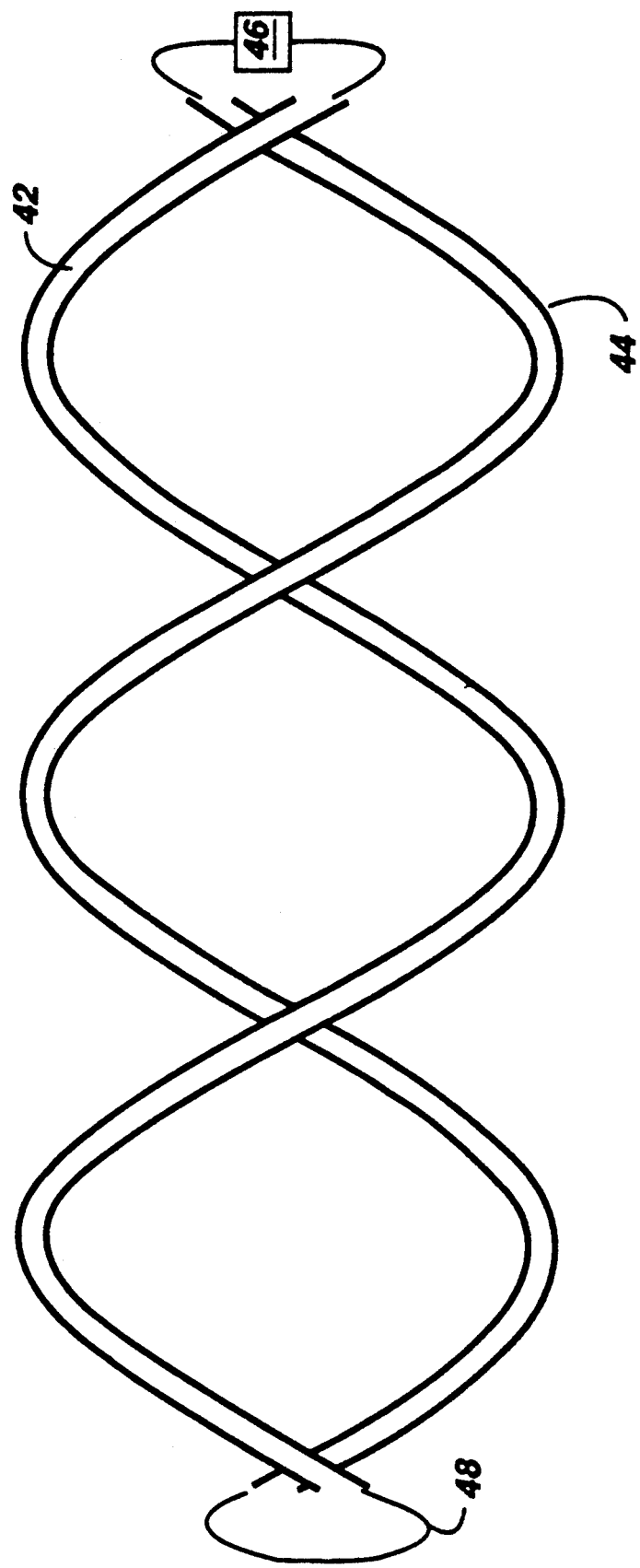
FIG. 10 is a schematic representation of the simplest helical array of equally-spaced electrical conductors (two conductors), alternate conductors carrying equal electrical currents in opposite directions.

FIG. 10 is a schematic representation of the simplest helical configuration of conductors useful for magnetic energy storage. Two electrical conductors 42, 44, are disposed in a helical manner about the surface of an imaginary cylinder. Electric current supply 46 provides approximately equal current to the conductors, but in opposite directions. Conducting loop 48 provides a return path for the current. A greater number of conductors may be employed so long as alternate conductors carry current equal to their nearest neighbors, but in the opposite direction, and each conductor has an opposing conductor disposed on the diameter of the cylinder opposite thereto carrying an about equal current in the opposite direction. An axial force is generated on the conductors, yielding a hoop stress if the cylinder is formed into a circular configuration in a similar manner to that generated when the ring configuration illustrated in FIG. 8 hereof is formed into a circular configuration. However, this hoop stress can be minimized if the diameter of the circle is large. It should be mentioned that radial forces are generated on the conductors in both the circular and linear configurations. Optimum spacing for the coils is approximately equal to the diameter thereof for magnetic energy storage, although in the linear configuration illustrated in FIG. 10 hereof, there are resulting radial forces generated on the conductors which rapidly approach zero as the coil spacing is reduced.

The foregoing description of the preferred embodiments of the invention has been presented for purposes of illustration and description. It is not intended to be exhaustive or to limit the invention to the precise form disclosed, and obviously many modifications and variations are possible in light of the above teaching. For example, it would be apparent to one having ordinary skill in the art of magnetic field generation, after having examined the subject disclosure, that the use of superconducting conductors and even high temperature superconducting conductors as they become available in forms capable of withstanding high magnetic fields and capable of carrying the enormous currents required, would be preferred over the use of wires having ordinary conduction properties. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What we claim is:

1. A magnetic energy storage apparatus having reduced mechanical forces and reduced magnetic pollution, which comprises in combination a set of substantially parallel, electrically isolated, elongated outer conducting elements spaced apart in a substantially equally distant manner around the surface of a cylinder having an axis and a chosen diameter, all of said outer conducting elements having a current flowing therein in a first direction, and a center, elongated conducting element disposed along the axis of the cylinder, said center conducting element having a current flowing therein in a direction opposite to the first direction, and wherein the ratio of the magnitude of the current flowing in said outer conducting elements to the magnitude of the current flowing in said center conducting element is selected such that the net force on said outer conducting elements and on said center conducting element is substantially zero away from the ends thereof.

2. The magnetic energy storage apparatus as described in claim 1, wherein the ratio of the magnitude of the current flowing in said outer conducting elements to the magnitude of the current flowing in said center conducting element is substantially given by the relationship $I_C/I_O = (N_O - 1)/2$, where $N_O$ is the number of said outer conducting elements in the set.

3. The magnetic energy storage apparatus as described in claim 1, wherein said outer conducting elements and said center conducting element are formed into a substantially circular configuration in the long dimension thereof, the circular configuration having an approximate diameter which is large when compared to the cross section of any of said outer conducting elements and said center conducting element and large when compared to the diameter of the cylinder.

4. The magnetic energy storage apparatus as described in claim 1, wherein said outer conducting elements and said center conducting element include superconducting elements.

5. A magnetic energy storage apparatus having reduced mechanical forces and reduced magnetic pollution comprising in combination two first elongated electrical conductors disposed parallel to one another, each of said first conductors carrying substantially the same current in the same direction, and one second elongated electrical conductor, said second conductor being disposed parallel to, in the same plane as, and substantially half-way between each of said first conductors, said second conductor carrying approximately one-half the current of each of said first conductors in the direction opposite to the current in each of said first conductors.

6. The magnetic energy storage apparatus as described in claim 5, wherein said electrical conductors include superconducting conductors.

7. A magnetic energy storage apparatus having reduced mechanical forces and reduced magnetic pollution, comprising in combination a substantially planar set of substantially equally spaced, parallel electrically isolated, elongated, electrically conducting elements having electrical current flowing in opposite directions in adjacent members of said electrically conducting elements, the planar set having an outer boundary, wherein current flowing in those of said electrically conducting elements disposed in the proximity of the outer boundary is smaller than the current flowing in said electrically conducting elements located interiorly to the outer boundary, and at least two substantially parallel, electrically isolated end electrical conductors associated with each end of each of said adjacent parallel electrically conducting elements for carrying the current from one of said electrically conducting elements to the adjacent of said electrically conducting elements thereto.

8. The magnetic energy storage apparatus as described in claim 7, wherein each of said end conductors is a substantially straight length of electrically conducting material.

9. The magnetic energy storage apparatus as described in claim 7, wherein said electrically conducting elements and said end conductors include superconducting materials.

10. A magnetic energy storage apparatus having reduced mechanical forces and reduced magnetic pollution, comprising in combination a set of first substantially equally spaced, parallel electrically isolated, elongated conducting elements, each of said first conducting elements having an electrical current flowing in a chosen direction, and a set of second substantially equally spaced, parallel electrically isolated, elongated conducting elements, each of said second conducting elements having an electrical current flowing in a direction opposite to the electrical current flowing in said first conducting elements, said first conducting elements and said second conducting elements being disposed in such a manner that the nearest neighbor of each of said first electrical conducting elements is one of said second conducting elements, said first conducting elements and said second conducting elements further forming an array having a cross section having an edge.

11. The magnetic energy storage apparatus as described in claim 10, wherein said conducting elements located closest to the edge carry lower electrical current than conducting elements located interior to the edge.

12. The magnetic energy storage apparatus as described in claim 10, wherein the array formed by said first electrically conducting elements and said second electrically conducting elements has a substantially parallelepiped cross section.

13. The magnetic energy storage apparatus as described in claim 10, wherein the cross section of the array is substantially rectangular, wherein the current carried by said first electrically conducting elements and said second electrically conducting elements located closest to the edge is approximately one-half the current carried by said first electrically conducting elements and said second electrically conducting elements located interiorly to the edge, and wherein the current carried by said first electrically conducting elements and said second electrically conducting elements located at the corners of the array is approximately one-fourth the current carried by said first electrically conducting elements and said second electrically conducting elements located interiorly to the corners.

14. The magnetic energy storage apparatus as described in claim 10, wherein said electrically conducting elements include superconducting elements.

15. A magnetic energy storage apparatus having reduced mechanical forces and reduced magnetic pollution comprising a set of electrically isolated, approximately circular conducting rings, each of said rings having an axis of approximate symmetry disposed in such a manner that the axis of approximate symmetry of each of said conducting rings is substantially collinear with the axis of the nearest of said conducting rings thereto, forming thereby a common axis, each of said conducting rings having an electric current flowing in the opposite direction to the electric current flowing in the nearest of said conducting rings thereto.

16. The magnetic energy storage apparatus as described in claim 15, wherein each of said conducting rings is spaced substantially equally distant from each of the closest conducting rings thereto.

17. The magnetic energy storage apparatus as described in claim 16, wherein said conducting rings have approximately the same diameter and are spaced approximately one radius apart.

18. The magnetic energy storage apparatus as described in claim 17, wherein each of said conducting rings carries substantially the same current.

19. The magnetic energy storage apparatus as described in claim 18, wherein said conducting rings forming the end of said apparatus carry one-half the current of said conducting rings interior thereto.

20. The magnetic energy storage apparatus as described in claim 15, wherein said conducting rings include superconducting elements.

21. The magnetic energy storage apparatus as described in claim 15, wherein the common axis of said conducting rings is formed into a substantially circular configuration, the circular configuration having a radius which is large when compared with the radius of any of said conducting rings.

22. The magnetic energy storage apparatus as described in claim 21, wherein each of said conducting ring has approximately the same diameter and are spaced approximately one radius apart along the common axis.

23. A magnetic energy storage apparatus having reduced mechanical forces and reduced magnetic pollution comprising in combination at least one pair of elongated electrical conductors, said conductors in said at least one pair of conductors being disposed in a helical manner along the surface of an elongated cylinder having a diameter and an axis, each of said conductors in said at least one pair of conductors being disposed approximately on opposing sides of a diameter of the cylinder, and each of said conductors in said at least one pair of conductors carrying substantially the same current, wherein the current flows in opposite directions one to the other in said conductors.

24. The magnetic energy storage apparatus as described in claim 23, wherein each turn of the helix thus formed is spaced approximately the radius of the elongated cylinder apart from the next turn thereof.

25. The magnetic energy storage apparatus as described in claim 23, wherein the axis of said at least one pair of elongated electrical conductors is formed into a substantially circular configuration, the circular configuration having a radius which is large when compared with the radius of the helix.

26. The magnetic energy storage apparatus as described in claim 23, wherein said conductors in said at least one pair of conductors include superconducting conductors.

* * * * *